(12) United States Patent
Morishima et al.

(10) Patent No.: US 8,299,648 B2
(45) Date of Patent: Oct. 30, 2012

(54) UPS AT THE RECOVERY MODE FROM THE POWER FAILURE

(75) Inventors: Yoichi Morishima, Houston, TX (US); David M. Westmoreland, Cypress, TX (US)

(73) Assignee: Toshiba International Corporation, Houston, TX (US)

( * ) Notice: Subject to any disclaimer, the term of this patent is extended or adjusted under 35 U.S.C. 154(b) by 317 days.

(21) Appl. No.: 12/717,506

(22) Filed: Mar. 4, 2010

(65) Prior Publication Data
US 2011/0215646 A1 Sep. 8, 2011

(51) Int. Cl.
*H02J 7/00* (2006.01)
*H02J 9/00* (2006.01)
(52) U.S. Cl. .......................................... 307/66
(58) Field of Classification Search ...................... 307/66
See application file for complete search history.

(56) References Cited

U.S. PATENT DOCUMENTS
6,201,371 B1 * 3/2001 Kawabe et al. ............... 320/121
* cited by examiner

*Primary Examiner* — Hal Kaplan
(74) *Attorney, Agent, or Firm* — Westerman, Hattori, Daniels & Adrian, LLP

(57) ABSTRACT

An uninterruptable power supply (UPS) designed to switch power inputs between an alternating current mode and a battery mode having a sensor to monitor a load current, and a central processing unit (CPU) to boost a bus voltage of the uninterruptable power supply by increasing a calculated reference voltage to a target reference voltage by a slope. The calculated reference voltage is calculated by the CPU based on a voltage drop value in main capacitors that occurs during a transfer time between the battery mode and the AC mode. The target reference voltage is the voltage across an equivalent circuit of the main capacitors before the voltage drop. The slope is based on a ratio of a voltage drop value across an equivalent circuit of main capacitors and a charging up time to reach the target reference voltage.

15 Claims, 7 Drawing Sheets

IMPROVED UPS AT THE RECOVERY MODE FROM THE POWER FAILURE

UPS AT THE RECOVERY MODE FROM THE POWER FAILURE

BACKGROUND

1. Field

This invention relates to an uninterruptible power supply, and more particularly to an uninterruptible power supply that optimizes the DC bus voltage to minimize inrush current during a transfer time between the battery mode and the AC mode.

2. Description of Related Art

The following description sets forth the inventors' knowledge of related art and problems therein and should not be construed as an admission of knowledge in the prior art.

As illustrated in FIG. 1, an uninterruptible power supply (UPS) has a generator 8 that is provided as an alternate source of AC power supply in an event of a power failure. The switching between commercial power 9 and a generator 8 is performed by a switch 10. The UPS system also constitute a battery thyristor 1, a main capacitor module 2, a battery module 3, an input filter circuit 4, an input converter module 5, an output inverter module 6 and an output filter module 7.

As shown in FIG. 2, during switching time from commercial power 9 to generator power 8, the UPS supplies power to the load using the battery module 3. Normally, during this switching time, the voltage across the main capacitor module 2 is boosted up by a battery package using a voltage boost up circuit.

However, as illustrated in FIG. 2, when the UPS is switched from the battery backup mode to the generator mode, the battery thyristor (THY) 1 turns off and the mode is transferred to AC input mode. During this transfer, which may take 1 cycle, the DC voltage across the main capacitor module 2 drops because of the energy consumed in capacitors as shown in by the exponential decay in the graphs of FIGS. 2 and 3. Therefore, when the generator input voltage is applied to the UPS, a large inrush current flows due to the voltage difference between the actual voltage and target voltage, which causes the voltage from the generator to drift causing unstable condition in generator operation as shown by the graphs in FIGS. 2 and 3.

In other words, during switching power from battery module 3 to the generator 8, a high current flows through the UPS due to the voltage drop in the DC bus. Especially, in a case of generator connection to AC line, this current may become large due to oscillations caused by the generator's internal impedance (inductance) and the impedance of input filtering capacitor. As a result of the large oscillatory current, the output voltage of the generator becomes unstable. When the UPS detects this unstable voltage and/or frequency, it moves the UPS to Battery backup mode again. In case where inrush current is too large, the problem of repeated switching between the generator mode and the battery backup mode occur thereby causing battery to burn up additional power.

SUMMARY

In an exemplary embodiment, the aforesaid problem of the related uninterruptable power supply may be solved by configuring the UPS to switch power inputs between an alternating current (AC) mode and a battery mode by including a sensor to monitor a load current, and a central processing unit (CPU) to boost a bus voltage of the uninterruptable power supply by increasing a calculated reference voltage to a target reference voltage by a slope. The calculated reference voltage is calculated based on a voltage drop value in main capacitors, that occurs during a transfer time between the battery mode and the AC mode, and is based on the load current, an input impedance and main capacitance values of the UPS. The target reference voltage is the voltage across an equivalent circuit of the main capacitors before the voltage drop. The slope is calculated based on a ratio of a voltage drop value across an equivalent circuit of main capacitors and a charging up time to reach the target reference voltage. The charging up time is based on the load current, input impedance and main capacitance values. The charging up time can also be adjusted based on the load current or on an averaged load current.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and other features and advantages of embodiments of the present invention will become more apparent by describing in detail exemplary embodiments thereof with reference to the attached drawings in which.

DETAILED DESCRIPTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 1:
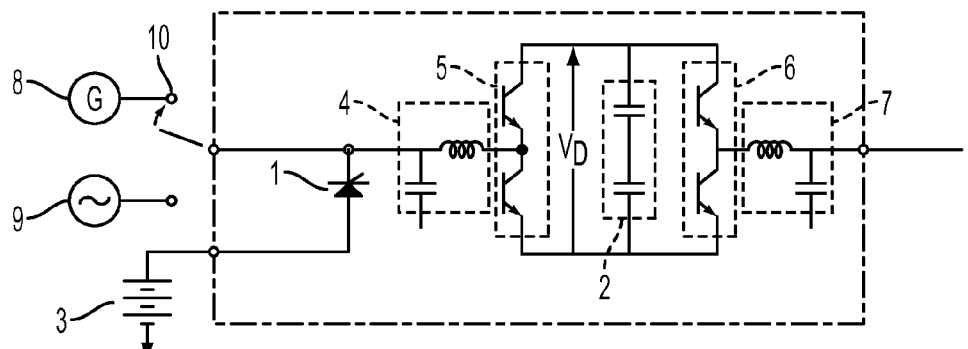
FIG. 1 is a circuit diagram of a related uninterruptable power supply.
Figure 2:
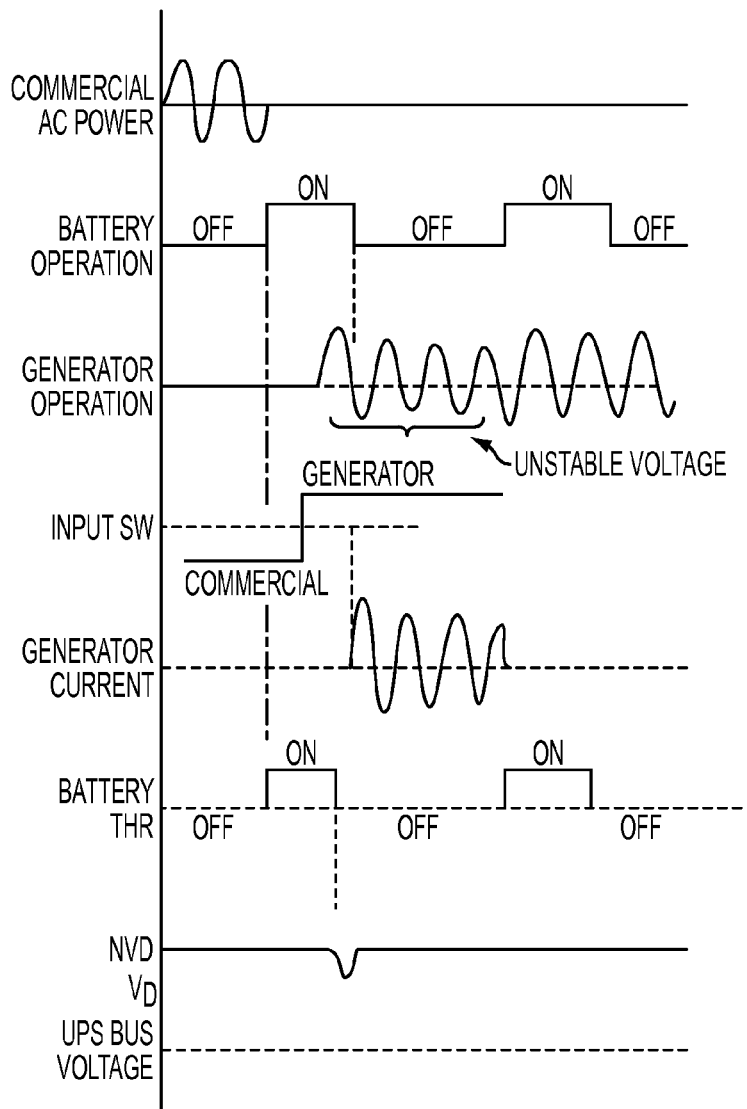
FIG. 2 is a timing diagram of currents, voltages and switches according to the uninterruptable power supply of FIG. 1.
Figure 3:
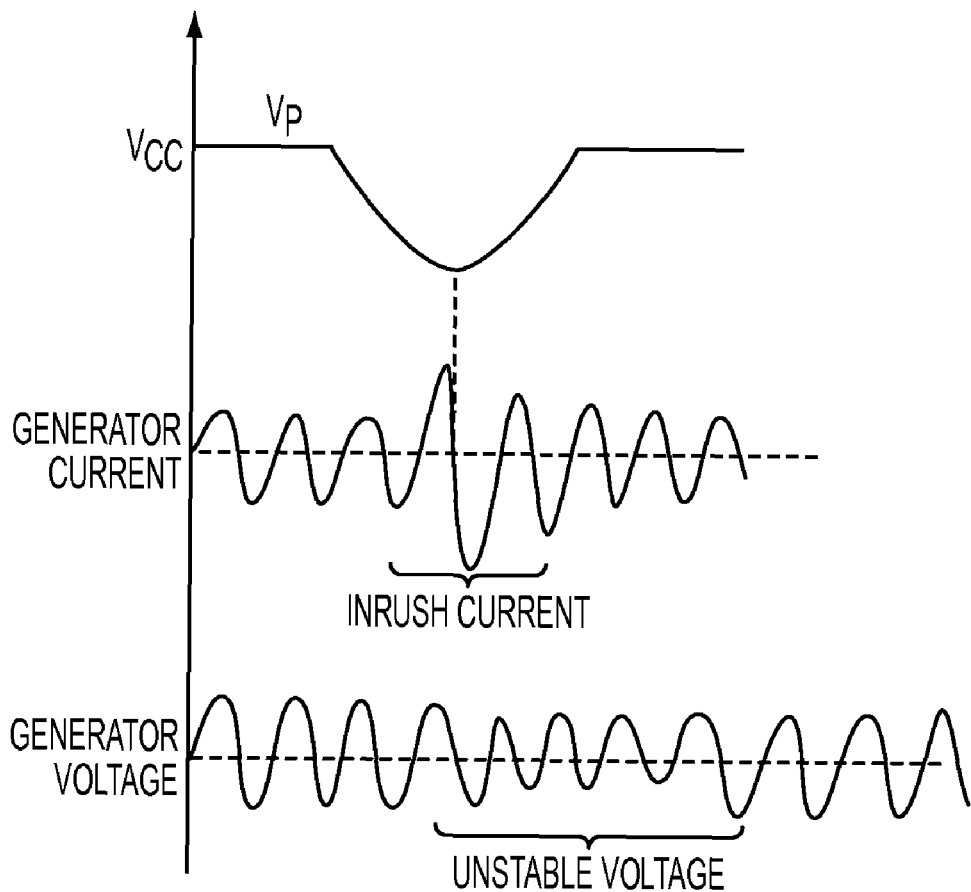
FIG. 3 is a more detailed timing diagram of currents and voltages according to the uninterruptable power supply of FIG. 1.
Figure 3:
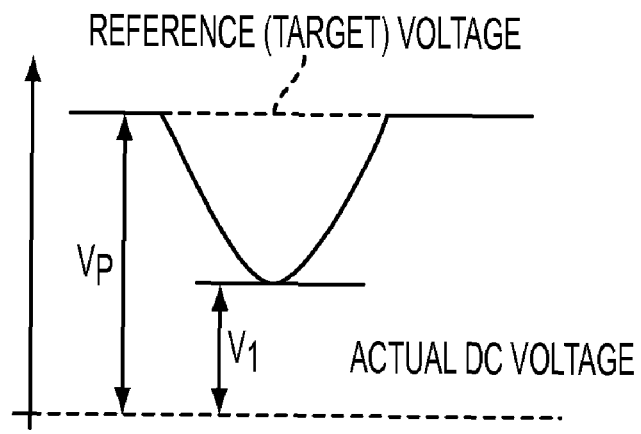
Figure 4:
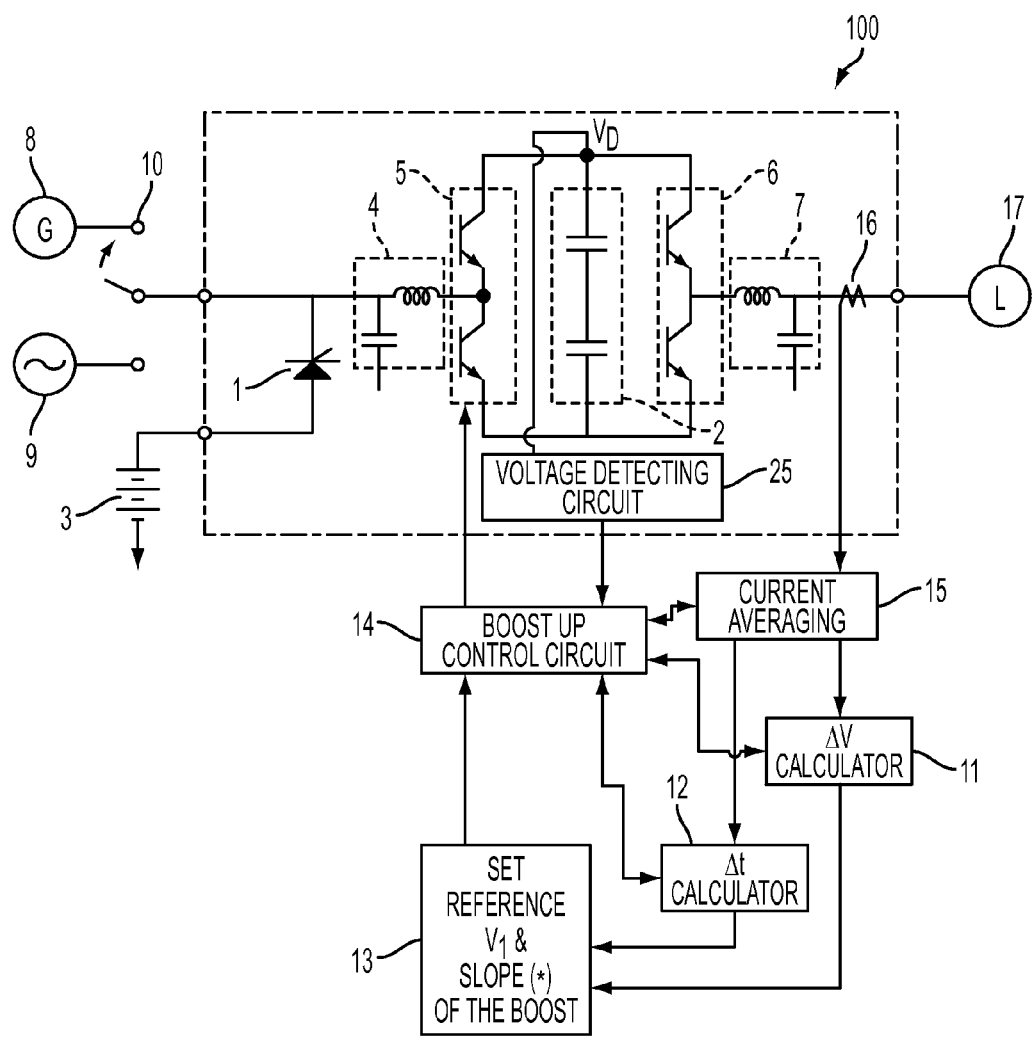
FIG. 4 is a circuit schematic of an uninterruptible power supply system according to an embodiment of the present application.

FIG. 4 illustrates an exemplary embodiment of the uninterruptable power supply 100 comprising a battery thyristor 1, a main capacitor module 2, a battery module 3, an input filter circuit 4, an input converter module 5, an output inverter module 6, an output filter module 7, an AC generator 8, a commercial AC power 9, a current sensor 16, a load 17, a current averaging module 15, a difference voltage module 11, a difference time calculator module 12, a setting module 13, a voltage detector circuit 25 and a boost up control circuit 14.

As illustrated in FIG. 4, the UPS 100 has a switch 10 for receiving input power from an alternating current source, such as commercial AC power from the power grid, or AC power from a generator or a DC power source such as a battery. This switch can be either a mechanical switch or a solid state switch. The main switch 10 and the battery module 3 are connected to the input of an input filter circuit 4. A thyristor 1 is connected between the output of the battery module 3 and the input of the input filter circuit 4. The input filter 4 receives the AC power from the power grid or the generator or the battery and sends it to the DC bus of the UPS. The DC bus comprises the input converter module 5, the main capacitor module 2 and output inverter module 6. The main capacitor module 2 is used for storing the energy for holding up the DC bus voltage. The voltage across the main capacitor module 2 is detected by the voltage detector circuit 25 and supplied to the boost up control circuit 14. The output inverter module 6 is connected to the input of the output filter module 7. A current sensor 16 is connected between the output of the output filter module 7 and the load 17.

The current sensor 16 detects the load current. Optionally, a current averaging module 15 can be connected to the current sensor 16 for averaging the detected current. The current averaging module 15 may average 2 cycles to 10 cycles of stored current in the memory 201 (FIG. 9) of the boost up control circuit 14. The memory 201 also stores the data values for main capacitor 2, element 19, element 20 (FIG. 7), power factor, DC/AC efficiency and switching period between Battery and AC mode.

Figure 5:
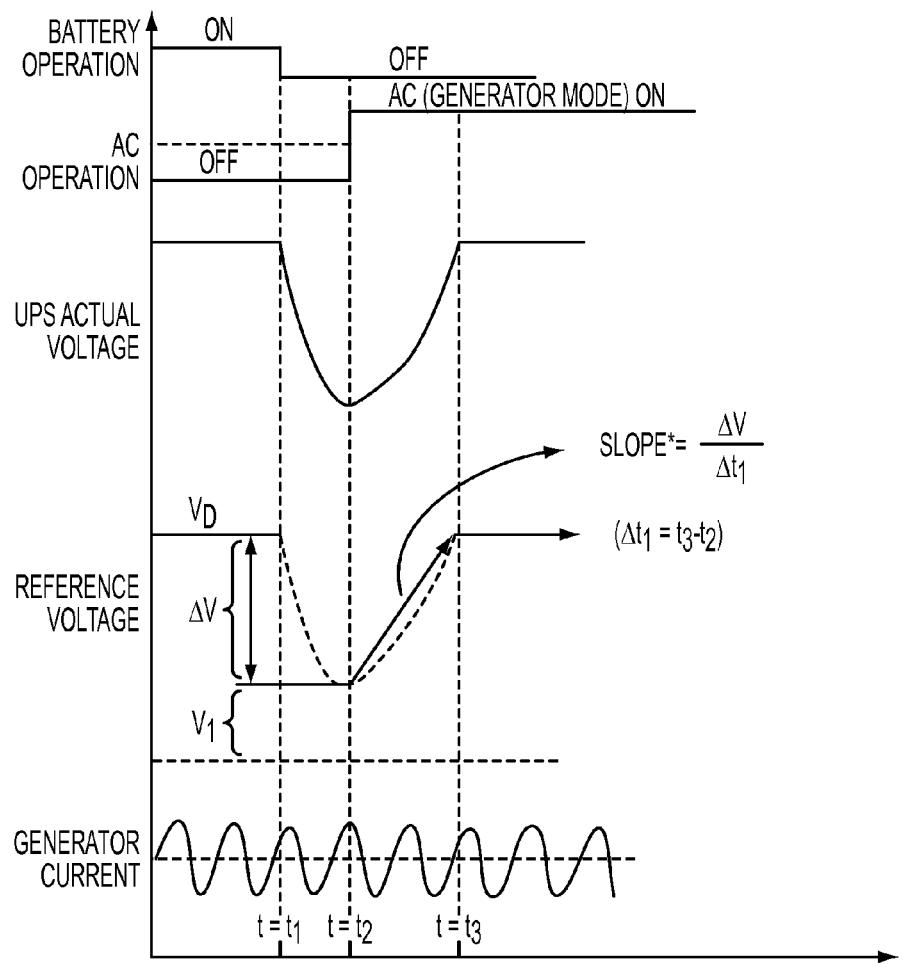
FIG. 5 is a timing diagram of currents, voltages and switches according to the uninterruptable power supply of FIG. 4.

Based on the load current (output current of the UPS), the voltage (Vo) across the main capacitor module 2, and stored values in memory 201, a difference voltage module 11 calculates the voltage difference ΔV as shown in FIG. 5 and as follows:

For example: UPS output 10 KVA
Output Power Factor (p.f.)=0.85
DC/AC efficiency=85%
Period=16 ms between Battery and AC mode $$\text{Energy consumption}(J) = \text{UPS output}(KVA) * \text{output p.f.} * 1/\text{DC-AC efficiency} * \text{period} \quad (1)$$

$$\text{UPS output}(KVA) = \text{output current at the load} * \text{output voltage at the load} \quad (1.1)$$

Energy consumption(J)=10*10³*0.85*1/0.85*16×10⁻³
Energy consumption(Ec)=160 Joules $$\text{The Energy storage at main capacitor} = \tfrac{1}{2} * C * V^2 \quad (2)$$

For C=8400 μF (micro farad)
Vo=770 Volts $$\tfrac{1}{2} * C(Vo^2 - V1^2) = Ec \quad (3)$$

$$\text{Therefore } V1 = \sqrt{Vo^2 - \frac{2Ec}{C}} \quad (4)$$

$$= \sqrt{770^2 - \frac{2 \times 160}{8400 \times 10^{-6}}} = 744 \text{ V}$$

Therefore, ΔV=Vo−V1=770−744=26 V

Figure 7:
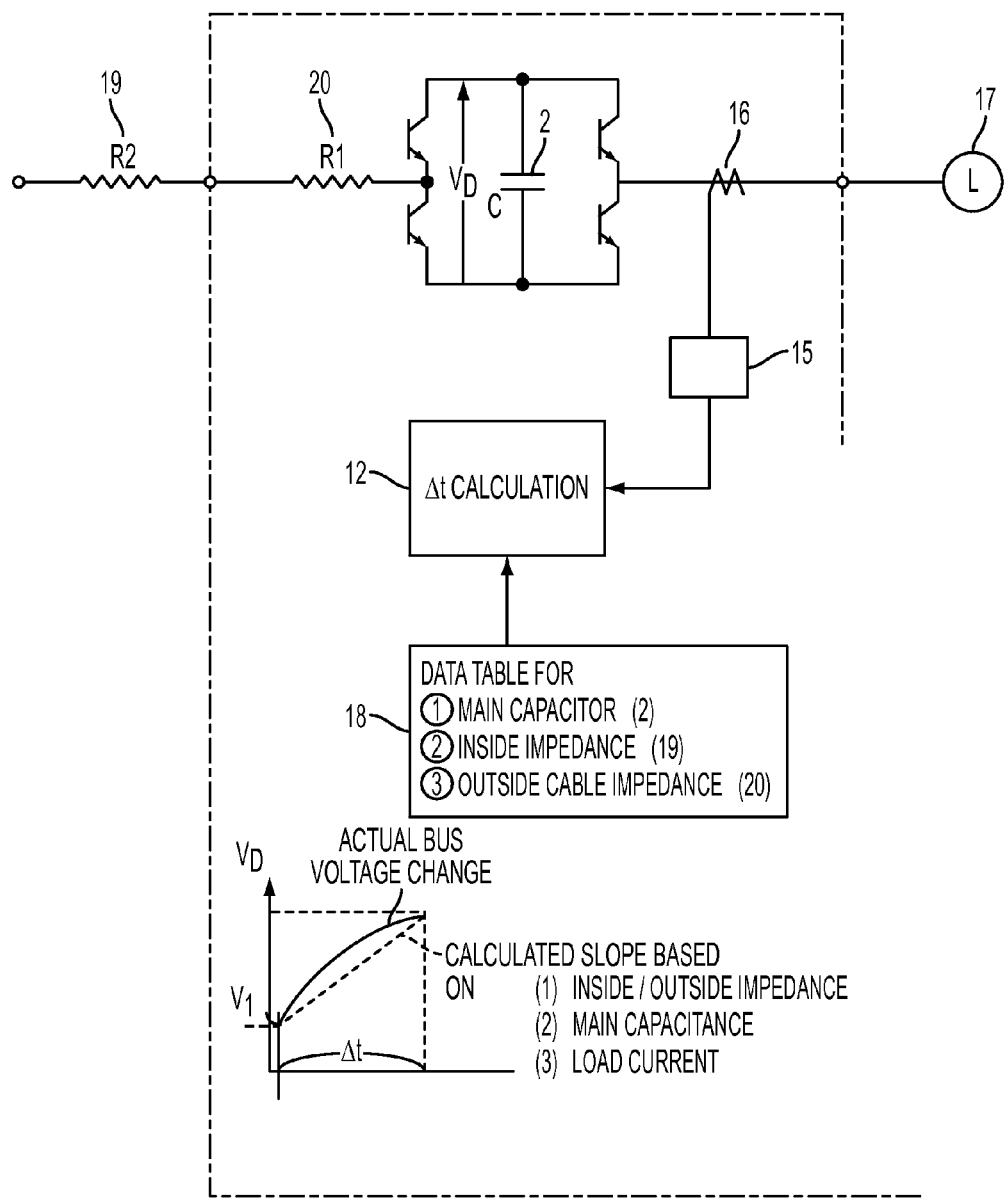
FIG. 7 is a circuit with a block diagram showing the information for calculating slope for the boost up operation.
Figure 9:
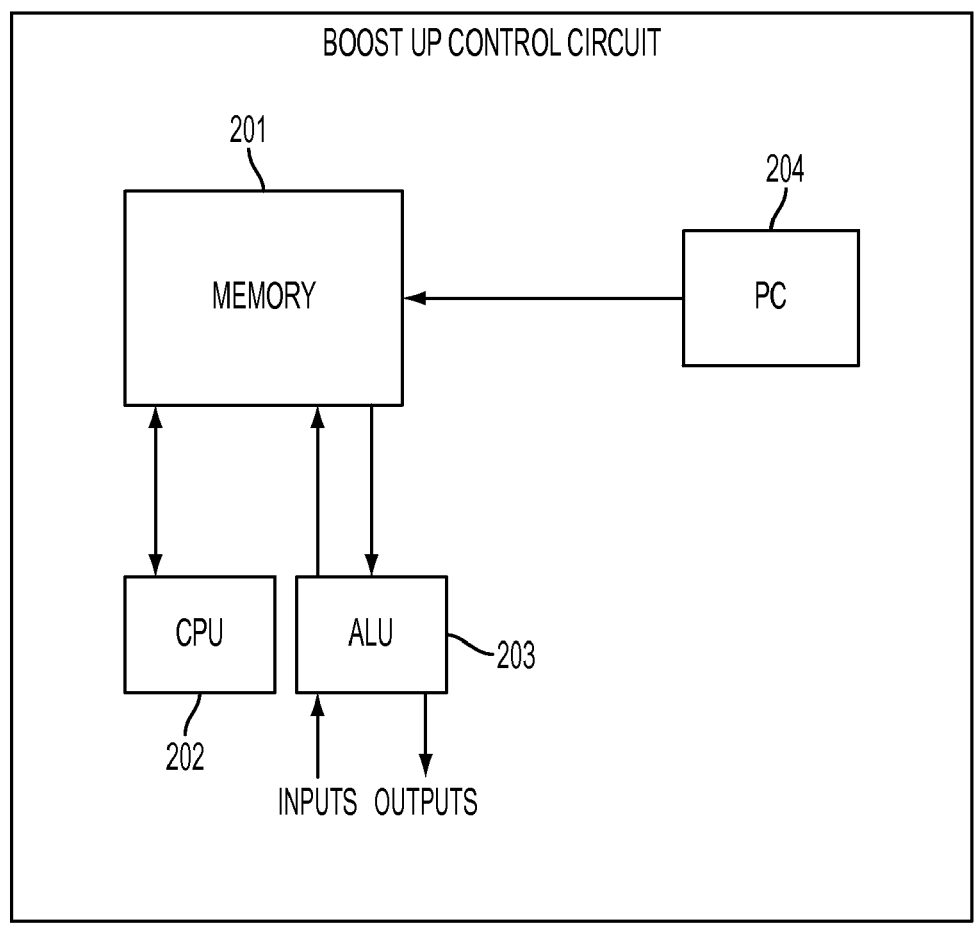
FIG. 9 is a block diagram showing some elements of the booster control circuit of FIG. 4.

Based on ΔV calculations, the central processing unit (CPU) sets the reference level at voltage V1 (FIG. 5) at the setting module 13. Also, as illustrated in FIG. 7, the difference time calculator module 12 receives detected or averaged load current from the current sensor 16 and calculates the charging up time (Δt1=t3−t2, FIG. 5) for the main capacitor module 2 based on table 18, which contains values for main capacitor 2 (FIG. 7), inside impedance 19 (generator internal impedance) and outside cable impedance 20. The table 18 is stored in the memory 201 (FIG. 9).

In other words, FIG. 7 shows how to decide the slope for the boost up. Basically the three factors: main capacitors 2 capacitance, input impedance R1 (cables impedance which are connected to the UPS) and R2 (internal impedance), and the load current will be considered in deciding the charging time (Δt). Based on these, the CPU will calculate suitable Δt.

Figure 8:
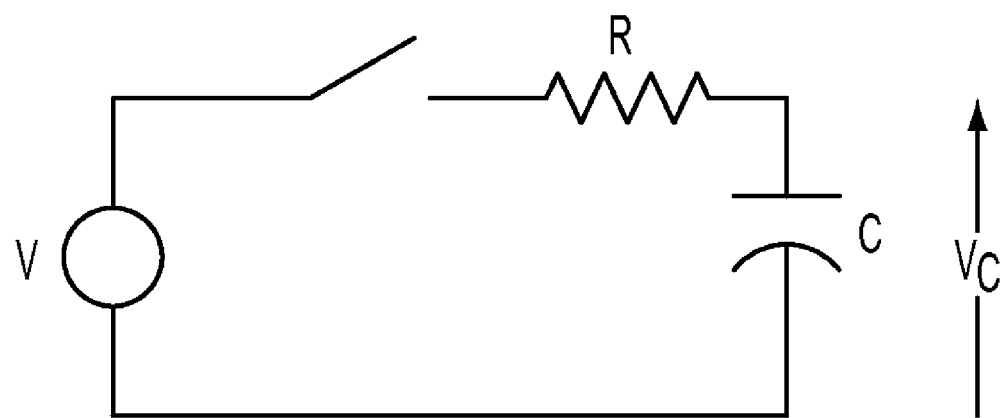
FIG. 8 is an equivalent RC circuit schematic for calculating a charging up time for the main capacitor module.

FIG. 8 shows the equivalent RC circuit model to calculate the charging up time based on the main capacitance value and input impedance. Although the load current will impact the boost time Vc(t), the actual impact of the load current on the boost time will be small and will be dependent on the system of the circuit after the main capacitance including load side information such as power factor and impedance.

At t≧0

$$Vc(t) = Vc(o)e^{-t/RC} + V(1 - e^{-t/RC})$$

where R=internal resistance (R1)+external resistance (R2) (cable)

The boost up control circuit 14 then boosts the DC bus voltage from the set reference voltage V1 to target voltage by the slope value an example of which is shown in FIG. 5. Therefore, by adjusting the reference voltage close to the actual DC bus voltage and boosting up the actual voltage charging speed as noted above, the inrush current from the generator will be minimized and the output voltage of the generator will be stabilized.

Figure 6:
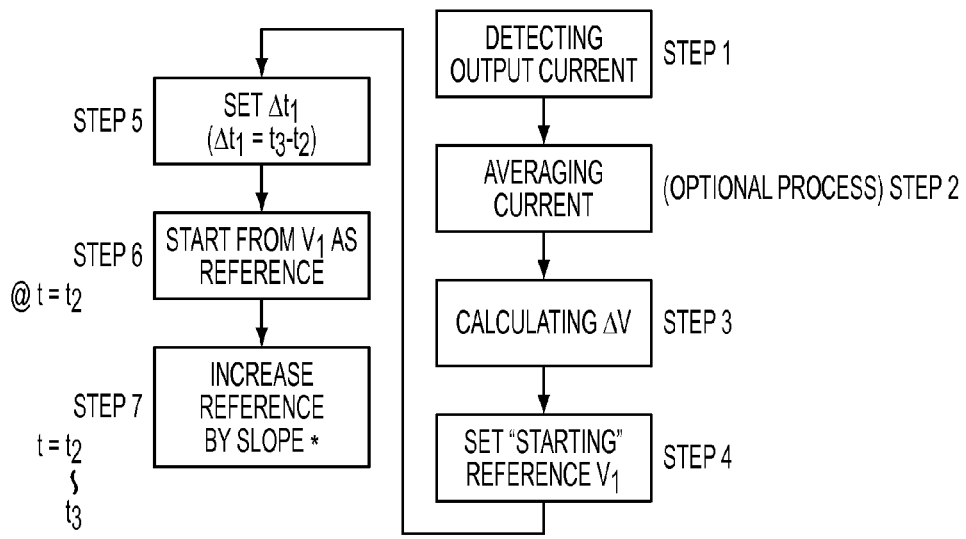
FIG. 6 is a flowchart showing the detailed step by step operation of the uninterruptable power supply circuit of FIG. 4.

FIG. 6 is a flow chart showing step by step process by which the the DC bus voltage is boosted up in the uninterruptable power supply 100. In step 1, the UPS detects the load current continuously. In step 2, the load currents are averaged by the control circuit. In step 3, by using the averaged load current value, the control circuit of the UPS will calculate Voltage drop (Δv) during the transfer time between the battery mode and AC mode. In step 4, by using the calculate Voltage drop (Δv), the control circuit sets the reference voltage level at V1 (=Vo−Δv). In step 5, by using impedance (internal+outside of the UPS) table and main capacitor value, the charging up time (Δt1=t3−t2) is set. In steps 6 and 7, the set reference voltage V1 is boosted up by the slope.

The control circuit may comprise a central processing unit (CPU), a computer, a computer unit, a data processor, a microcomputer, microelectronics device, or a microprocessor. The control circuit includes a memory 201, a CPU 202, a program counter (PC) 204 and an arithmetic logic unit (ALU) 203 as illustrated in FIG. 9. The memory includes, but is not limited to a read/write memory, read only memory (ROM), random access memory (RAM), DRAM, SRAM etc.

While embodiments of the present disclosure have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An uninterruptable power supply (UPS) configured to switch power inputs between an alternating current (ac) mode and a battery mode, comprising:
   a sensor to monitor a load current; and a central processing unit (CPU) to boost a bus voltage of said uninterruptable power supply by increasing a calculated reference voltage to a target reference voltage by a slope, wherein said slope is calculated as a ratio of a voltage drop value across main capacitors in a main capacitor module and a charging up time of the main capacitor module.

2. The uninterruptable power supply as set forth in claim 1, wherein:

said calculated reference voltage is calculated by the CPU based on the voltage drop value in the main capacitors, that occurs during a transfer time between the battery mode and the ac mode, and is based on the load current, an input impedance and main capacitance values of the UPS; and said target reference voltage is the voltage across an equivalent circuit of the main capacitors before the voltage drop.

3. The uninterruptable power supply as set forth in claim 1, wherein:

said charging up time is based on the load current, an input impedance and main capacitance values.

4. The uninterruptable power supply as set forth in claim 3, wherein:

the charging up time is adjusted based on the load current.

5. The uninterruptable power supply as set forth in claim 4, wherein:

the charging up time is adjusted based on an averaged load current from a current averaging unit.

6. An uninterruptable power supply method for switching power inputs between an alternating current (ac) mode and a battery mode, comprising:

monitoring a load current; and boosting a bus voltage of said uninterruptable power supply by increasing a calculated reference voltage to a target reference voltage by calculating a slope as a ratio of a voltage drop value across main capacitors in a main capacitor module and a charging up time of the main capacitor module, wherein said calculated reference voltage is calculated by a central processing unit based on the voltage drop value that occurs during a transfer time between the battery mode and the ac mode and is based on the load current, an input impedance and main capacitance values.

7. The method as set forth in claim 6, wherein:

said target reference voltage is the voltage across an equivalent circuit of the main capacitors before the voltage drop.

8. The method as set forth in claim 6, wherein:

said charging up time is based on the load current, the input impedance and the main capacitance values.

9. The method as set forth in claim 8, further comprising:

adjusting the charging up time based on the load current.

10. An uninterruptable power supply (UPS) system configured to switch power inputs between an alternating current (ac) mode and a battery mode, comprising:

a switch configured to switch between a plurality of ac power sources;

a sensor to monitor a load current; and a central processing unit (CPU) to boost a bus voltage of said uninterruptable power supply by increasing a calculated reference voltage to a target reference voltage by a slope, wherein said slope is calculated as a ratio of a voltage drop value across main capacitors in a main capacitor module and a charging up time of the main capacitor module.

11. The system as set forth in claim 10, wherein:

said calculated reference voltage is calculated by the CPU based on the voltage drop value in the main capacitors, that occurs during a transfer time between the battery mode and the ac mode, and is based on the load current, an input impedance and main capacitance values of the UPS; and said target reference voltage is the voltage across an equivalent circuit of the main capacitors before the voltage drop.

12. The system as set forth in claim 10, wherein:

said charging up time is based on the load current, an input impedance and main capacitance values.

13. The system as set forth in claim 12, wherein:

the charging up time is adjusted based on the load current.

14. The system as set forth in claim 13, wherein:

the charging up time is adjusted based on an averaged load current from a current averaging unit.

15. An article of manufacture, comprising:

a machine-accessible medium having instructions encoded thereon for enabling a processor to execute an operation for switching power inputs between an alternating current (ac) mode and a battery mode in an uninterruptable power supply, comprising the steps of:

detecting a load current continuously;

averaging the load current;

using the averaged load current value to calculate a voltage drop during a transfer time between the battery mode and the ac mode;

using the voltage drop to set a reference level;

using an impedance table and a main capacitor value to set a charging up time; and boosting the reference voltage by calculating a slope as a ratio of a voltage drop value across the main capacitor and the charging up time of the main capacitor module.

* * * * *